United States Patent [19]

Yoon

[11] Patent Number: 5,432,501
[45] Date of Patent: Jul. 11, 1995

[54] POWER SUPPLY SOURCE CONTROL APPARATUS FOR A SATELLITE BROADCAST RECEIVER

[75] Inventor: Jae-yong Yoon, Seoul, Rep. of Korea

[73] Assignee: Samsung Electronics Co., Ltd., Kyungki, Rep. of Korea

[21] Appl. No.: 186,984

[22] Filed: Jan. 28, 1994

[30] Foreign Application Priority Data

Jan. 28, 1993 [KR] Rep. of Korea .................. 93-1061

[51] Int. Cl.⁶ ............................................. G08B 21/00
[52] U.S. Cl. .................... 340/650; 455/12.1; 327/538; 323/906
[58] Field of Search ............ 340/650; 327/538; 323/906; 361/18; 455/12.1; 136/292; 244/158 R

[56] References Cited

U.S. PATENT DOCUMENTS

| | | | |
|---|---|---|---|
| 3,562,730 | 2/1971 | Hill et al. | 340/650 |
| 3,851,322 | 11/1974 | Compoly et al. | 340/650 |
| 4,823,135 | 4/1989 | Hirashima et al. | 342/362 |
| 5,134,486 | 7/1992 | Suzuki et al. | 358/190 |

*Primary Examiner*—Jeffery A. Hofsass
*Assistant Examiner*—Julie Lieu
*Attorney, Agent, or Firm*—Sughrue, Mion, Zinn, Macpeak & Seas

[57] ABSTRACT

Disclosed is a power supply source control apparatus for a satellite broadcast receiver. The voltage supplied to the outdoor-installed satellite broadcast receiving facilities is compared with a reference voltage to detect whether there is an extraordinary state such as a short circuit in a power source. In response to the detected signal, a signal for disconnecting the power supply voltage is generated. At the same time, a display device is made to operate to inform the user of the power failure.

6 Claims, 4 Drawing Sheets

POWER SUPPLY SOURCE CONTROL APPARATUS FOR A SATELLITE BROADCAST RECEIVER

The disclosure in Korean Patent Application 93-1061, filed Jan. 28, 1993, is incorporated herein by reference.

BACKGROUND OF THE INVENTION

The present invention relates to a power supply source control apparatus for a satellite broadcast receiver, and more particularly, to a power supply source control apparatus capable of preventing a power supply source from being damaged when a low noise unit and an antenna direction adjuster, which are installed outdoors to receive a satellite broadcast, are shorted or misoperate.

Due to increased use of satellite broadcast systems, there have been a lot of development activities recently in this field. In particular, as one example of a polarization control method for a satellite broadcast receiver, vertical and horizontal polarized waves are controlled by varying the supply voltage for a low noise unit. Another method is to make the supply voltage for the low noise unit fixed and provide an independent power supply source for controlling the vertical and horizontal polarized waves. It has become necessary to have a power supply source switching unit for the low noise unit or a power supply source switching unit for exclusive use in controlling only the vertical and horizontal polarized waves.

Referring to FIG. 1, a conventional satellite broadcast receiver will be described. A parabolic antenna 11 for receiving radio waves from a broadcasting satellite is connected to low noise booster unit 12 for amplifying weak radio waves up to necessary signal levels. An antenna direction adjuster 13 adjusts the direction of parabolic antenna 11 according to the position of the satellite. A satellite broadcast receiver 14 for supplying power to the respective satellite broadcast receiving facilities and for processing a signal transmitted from low noise booster unit 12 is connected to a television receiver 15.

Parabolic antenna 11, which is an outdoor dish-shaped antenna, receives the radio waves from the broadcasting satellite and supplies the received radio waves to the low noise unit 12. Low noise booster unit 12 amplifies and frequency-converts the weak satellite broadcast signals received from parabolic antenna 11 into signals having the necessary signal levels, and then outputs the converted signal through a cable, such as a coaxial cable. Antenna direction adjuster 13 adjusts the direction of parabolic antenna 11 according to the position of the satellite. Satellite broadcast receiver 14 receives the satellite broadcast signals from low noise booster unit 12 and converts the received satellite broadcast signals into those having formats suitable for display on television receiver 15. Television receiver 15 displays the signals supplied from satellite broadcast receiver 14 on a screen. In FIG. 1, parabolic antenna 11, low noise booster unit 12 and antenna direction adjuster 13 are installed outdoors, while satellite broadcast receiver 14 and television receiver 15 are installed indoors. The satellite broadcast facilities which are installed outdoors receive their power from the satellite broadcast receiver 14.

The low noise unit 12, which is installed outdoors as described above, is connected to a tuner in the satellite broadcast receiver through a cable. Also, the low noise booster unit 12 and the antenna direction adjuster 13 receive the power and control signals from satellite broadcast receiver 14 through the cable. Thus, if a short circuit occurs in the low noise booster unit 12 or the antenna direction adjuster 13, overcurrent flows into the satellite broadcast receiver 14, thereby causing the satellite broadcast receiver to be damaged.

SUMMARY OF THE INVENTION

Therefore, to solve the above problems, it is an object of the present invention to provide a power supply source control apparatus for a satellite broadcast receiver, in which power supply voltage supplied to satellite broadcast facilities which are installed outdoors is continuously checked to determine whether or not the power supply voltage is abnormal, the power supply voltage is disconnected from the satellite broadcast facilities if the power supply voltage is abnormal, and a display is enabled to inform a user of a power failure.

To accomplish the above object of the present invention, there is provided a power supply source control apparatus for a satellite broadcast receiver for use in a power supply source unit for supplying power to outdoor-installed satellite broadcast receiving facilities, the power supply source control apparatus comprising:

a switch portion for performing a switching operation in response to a control signal after receiving a drive signal; a voltage generator for generating a plurality of voltage values for driving the outdoor-installed satellite broadcast receiving facilities if the drive signal is applied from the switch portion; a voltage selector for receiving a first voltage value and a second voltage value from the voltage generator and a ground voltage value from a ground terminal and generating a corresponding voltage value in response to a first selection signal; a polarized wave controller for receiving a third voltage value from the voltage generator and supplying the received third voltage to a power supply source for controlling vertical polarized wave or horizontal polarized wave in response to a second selection signal; a microcomputer for supplying the first selection signal to the voltage selector, the second selection signal to the polarized wave controller and the control signal to the switch portion; and an extraordinary voltage detection portion for comparing a fifth voltage value output from the voltage selector, a sixth voltage value output from the polarized wave controller and a fourth voltage value output from the voltage generator with a reference voltage value, respectively, and supplying a comparison result to the microcomputer.

DETAILED DESCRIPTION OF THE PREFERRED EMBODIMENT

A preferred embodiment of the present invention will be described below in more detail with reference to the accompanying drawings.

Figure 2:
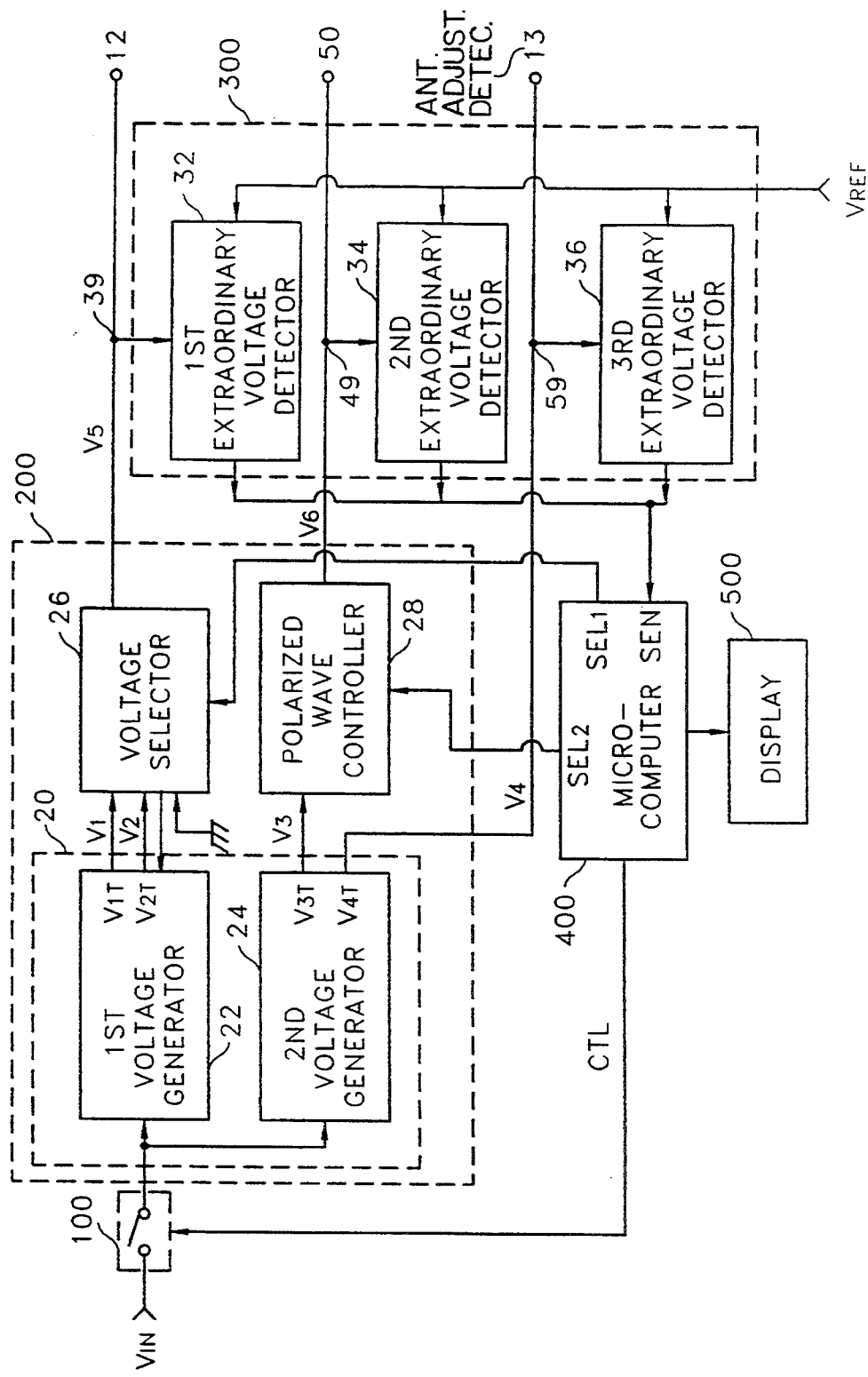
FIG. 2 is a block diagram of a power supply source control apparatus of a satellite broadcast receiver according to the present invention.

FIG. 2 shows a power supply source control apparatus for a satellite broadcast receiver according to the present invention. In FIG. 2, the power supply source control apparatus comprises a switch portion 100 for receiving an input voltage $V_{IN}$ and performing a switching operation according to a predetermined control signal CTL, a power supply source portion 200 for supplying necessary voltage to satellite broadcast facilities according to input voltage $V_{IN}$, an extraordinary voltage detection portion 300 for detecting whether or not an extraordinary state occurs in the voltage supplied to the satellite broadcast facilities, a microcomputer 400 for controlling the operation of switch portion 100 and the voltage generation of power supply source portion 200 and generating the detected extraordinary state information, and a display portion 500 for displaying the extraordinary state information on a display.

Power supply source portion 200 comprises a voltage generator 20, a voltage selector 26 and a polarized wave controller 28. A first voltage generator 22 in voltage generator 20 comprises first and second voltage output terminals $V_{1T}$ and $V_{2T}$. First voltage value $V_1$ and second voltage value $V_2$ are input to voltage selector 26. A second voltage generator 24 comprises third and fourth voltage output terminals $V_{3T}$ and $V_{4T}$. Third voltage value $V_3$ is used for polarization control, and fourth voltage value $V_4$ is supplied to antenna direction adjustor 13 of FIG. 1. Voltage selector 26 receives first and second voltage values $V_1$ and $V_2$ and ground voltage and generates a fifth voltage value $V_5$. Polarized wave controller 28 generates a sixth voltage value $V_6$ for controlling vertical polarized wave and horizontal polarized wave, and is connected to a second voltage generator 24 so as to be supplied with third voltage value $V_3$. Voltage selector 26 and polarized wave controller 28 are connected to microcomputer 400 so as to be supplied with selection control signals $SEL_1$ and $SEL_2$, respectively.

Extraordinary voltage detection portion 300 comprises a first extraordinary voltage detector 32 which receives output voltage $V_5$ of voltage selector 26, a second extraordinary voltage detector 34 which receives output voltage $V_6$ of polarized wave controller 28, and a third extraordinary voltage detector 36 which receives fourth voltage $V_4$ of second voltage generator 24. Extraordinary voltage detectors 32, 34 and 36 supply the detected information to microcomputer 400.

When switch portion 100 supplies input voltage $V_{IN}$ to voltage generator 20 in response to control signal CTL of microcomputer 400, voltage generator 20 supplies power to the outdoor-installed satellite broadcast receiving facilities. Voltage selector 26 selects one of the output voltages from first voltage generator 22 or the ground voltage in response to the first selection signal $SEL_1$ from microcomputer 400. The selected voltage is supplied to low noise unit 12 of FIG. 1 and at the same time to first extraordinary voltage detector 32 of extraordinary voltage detection portion 300. Polarized wave controller 28 receives the third voltage $V_3$ of 12 V from second voltage generator 24, and outputs third voltage $V_3$ as a voltage signal for controlling vertical and horizontal polarized waves in response to second selection signal $SEL_2$ supplied from microcomputer 400. Output voltage $V_6$ of polarized wave controller 28 is also supplied to second extraordinary voltage detector 34.

Figure 1:
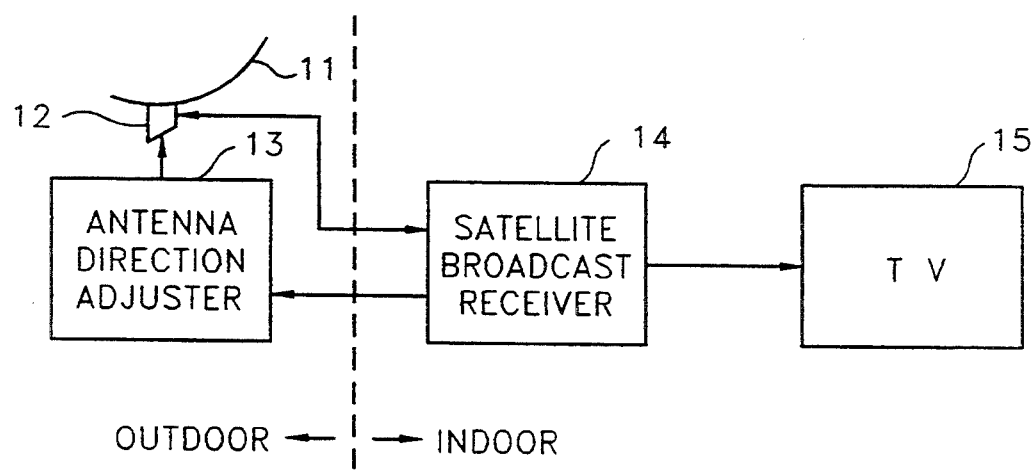
FIG. 1 is a block diagram of a conventional satellite broadcast receiving apparatus.

First extraordinary voltage detector 32 of extraordinary voltage detection portion 300 receives the same voltage $V_5$ as that supplied to low noise booster unit 12 of FIG. 1, compares the received voltage with the preset reference voltage $V_{REF}$, and outputs the result as a binary signal. First extraordinary voltage detector 32 generates a low signal for a sense terminal SEN of microcomputer 400 if the voltage $V_5$ supplied to the low noise booster unit 12 is higher than reference voltage $V_{REF}$, that is, when the former is in the normal state, or a high signal for sense terminal SEN of microcomputer 400 if the former is lower than the latter, that is, when the former is in the extraordinary state. Second extraordinary voltage detector 34 receives the voltage for controlling the vertical and horizontal polarized waves and compares the received signal with reference voltage $V_{REF}$ to detect if the voltage $V_6$ is in an extraordinary state. Also, third extraordinary voltage detector 36 receives fourth voltage $V_4$ of approximately 6 V, which is the output voltage of second voltage generator 24, and compares the received voltage $V_4$ with reference voltage $V_{REF}$. Reference voltage $V_{REF}$ supplied to extraordinary voltage detectors 32, 34 and 36 is set to have a value smaller than the voltage output from voltage generator 20.

Figure 4:
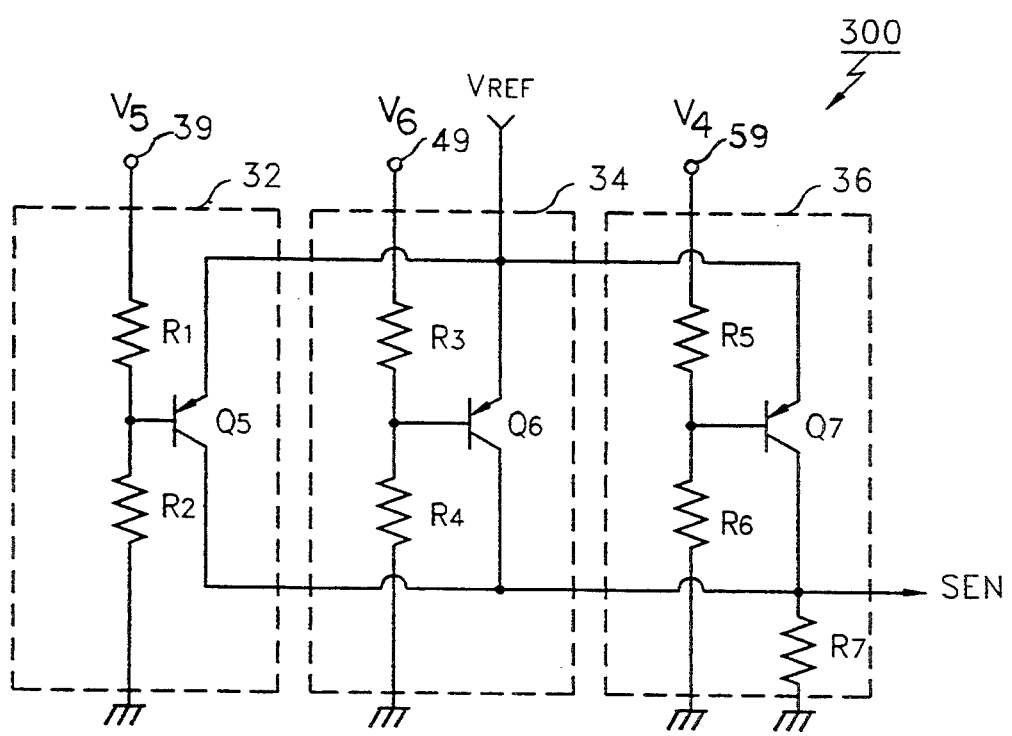
FIG. 4 is a detailed circuit diagram representing an extraordinary voltage detection portion of FIG. 2.

Extraordinary voltage detection portion 300 may be formed as a hardwired OR gate pattern as shown in FIG. 4. Accordingly, if at least one of the extraordinary voltage detectors detects an extraordinary voltage, i.e., a low voltage, microcomputer 400 is notified of the extraordinary state. If the extraordinary state has been detected, microcomputer 400 causes switch portion 100 to open or switch off, thereby disconnecting the drive voltage. At the same time, microcomputer 400 drives display portion 500, which may be an on-screen display or a light emitting diode, to thereby inform the user that the outdoor-installed satellite broadcast facilities have misoperated.

Figure 3A:
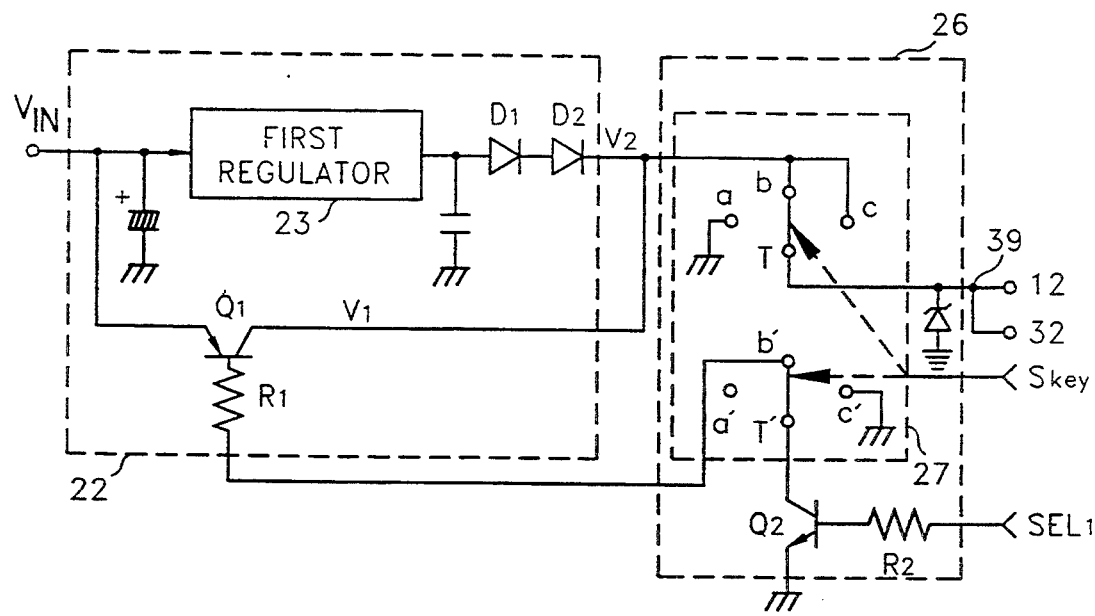
FIGS. 3A and 3B are detailed circuit diagrams representing power supply source portions of FIG. 2.
Figure 3B:
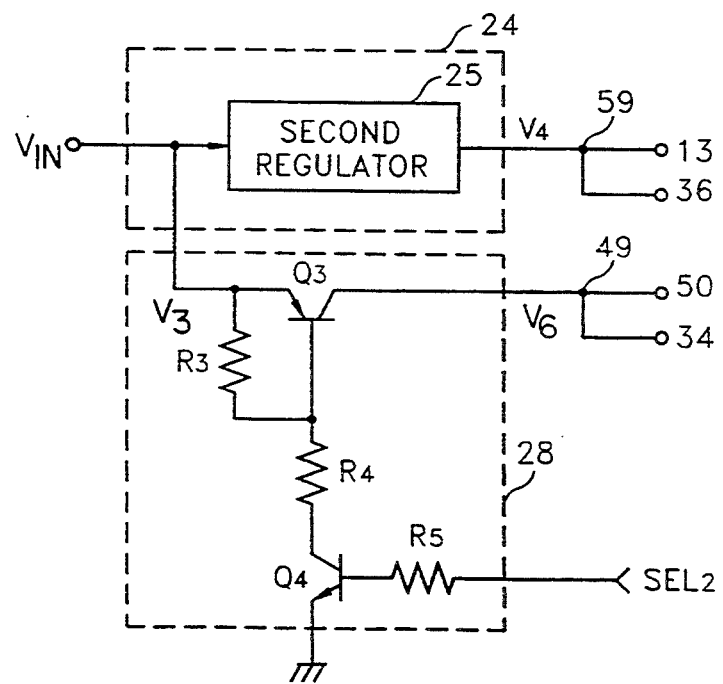

FIGS. 3A and 3B are detailed circuit diagrams which represent the power supply source portion of FIG. 2. FIG. 3A shows first voltage generator 22 and voltage selector 26 of FIG. 2, and FIG. 3B shows second voltage generator 24 and polarized wave controller 28. The apparatuses of FIGS. 3A and 3B use the same reference symbols with respect to the same elements as those of FIG. 2.

First voltage generator 22 of FIG. 3A receives $V_{IN}$, which here is designated as first voltage $V_1$ of 18 V, and converts the received voltage into second voltage $V_2$ of 15 V, and comprises a first regulator 23 made of a chip having a number of 7815IC, diodes $D_1$ and $D_2$, and a PNP-type first transistor $Q_1$. First transistor $Q_1$ receives first voltage $V_1$ through the emitter electrode thereof. Diodes $D_1$ and $D_2$ ensure that $V_1$ appears at the output when $Q_1$ is on and $V_2$ appears at the output when $Q_1$ is off. Voltage selector 26 comprises a second transistor $Q_2$ which is driven between turn-on and turn-off states according to first selection signal $SEL_1$ of microcomputer 400 and an interlock switch portion 27. Interlock switch portion 27 comprises switching arms T and T' which are respectively connected to the low noise booster unit 12 and the collector electrode of second transistor $Q_2$, first contact point a and a' which are respectively connected to the ground and an open terminal, second contact points b and b' which respectively receive one of supply voltages $V_1$ and $V_2$ of first voltage generator 22 and connect to the base electrode of first transistor $Q_1$, and third contact points c and c' which receive first voltage $V_1$ of first voltage generator 22 and are connected to ground, respectively. Interlock switch portion 27 selectively switches one among the respective contact points according to the user's manipulation signal $S_{key}$.

Second voltage generator 24 of FIG. 3B receives $V_{IN}$, which is also designated as third voltage $V_3$ of approximately 12 V, and converts the received voltage into fourth voltage $V_4$ of about 6 V, and comprises a second regulator 25 made of a chip having a number of 7806IC. Polarized wave controller 28 comprises a third transistor $Q_3$ of which the emitter electrode receives third voltage $V_3$ identical to the voltage input to second regulator 25, and the base electrode is connected to the emitter electrode through a resistor $R_3$, and a fourth transistor $Q_4$ of which the collector electrode is connected to the base electrode of third transistor $Q_3$, and which is turned on and off by second selection signal $SEL_2$ supplied from microcomputer 400.

When the user supplies the power to low noise booster unit 12 of FIG. 1, drive voltage $V_{IN}$, which equals $V_1$ of 18 V, is supplied to first regulator 23 of first voltage generator 22 and the emitter electrode of first transistor $Q_1$ from satellite broadcast receiver 14. Here, when interlock switch portion 27 is in the state of FIG. 3A, the first selection signal $SEL_1$ from microcomputer 400, which is applied to the base electrode of second transistor $Q_2$ through a resistor $R_2$, controls the on/off states of first and second transistors $Q_1$ and $Q_2$.

That is, when first selection signal $SEL_1$ is high, second transistor $Q_2$ is turned on and first transistor $Q_1$ becomes turned on to provide first voltage $V_1$ of 18 V at the output of generator 22. In this case, diodes $D_1$ and $D_2$ will be reverse biased so no output from regulator 23 will pass therethrough. First voltage $V_1$ is supplied to the low noise unit and to the first extraordinary voltage detector 32 through interlock switch portion 27.

On the other hand, when first selection signal $SEL_1$ is low, second transistor $Q_2$ turns off and first transistor $Q_1$ becomes turned off. First regulator 23 lowers first voltage $V_1$ of 18 V to second voltage $V_2$ of 15 V and generates the lowered voltage which is reduced to a level of 14 V while passing through diodes $D_1$ and $D_2$. Second voltage $V_2$ is supplied to the low noise booster unit 12 and first extraordinary voltage detector 32.

When a separate voltage is supplied to the low noise booster unit, 12 in order to control the vertical and horizontal polarized waves instead of fixing the supply voltage for the low noise booster unit, 12 the operation of FIG. 3A is as follows. In this case, switching arms T and T' are connected to third contact points c and c', respectively. Accordingly, $Q_1$ will be turned on irrespective of $SEL_1$ and first voltage $V_1$ will be supplied to the low noise unit and first extraordinary voltage detector 32.

In polarized wave controller 28, a binary signal $SEL_2$ for controlling the vertical and horizontal polarized waves supplied from microcomputer 400 is supplied to the base electrode of fourth transistor $Q_4$ through a resistor $R_5$. If fourth transistor $Q_4$ is turned on, third transistor $Q_3$, of which the emitter electrode receives third voltage $V_3$ of 12 V, becomes turned on. Accordingly, a voltage $V_6$ for controlling the polarized wave is supplied to an output terminal 50 and second extraordinary voltage detector 34. If fourth transistor $Q_4$ is turned off, polarized wave controller 28 generates third voltage $V_3$ for controlling the corresponding polarized wave through resistor $R_3$ connected between the emitter electrode and the base electrode of third transistor $Q_3$.

Power is supplied to antenna direction adjuster 13 of FIG. 1 via second regulator 25, which converts third voltage $V_3$ of 12 V into fourth voltage $V_4$ of 6 V, and supplies the converted voltage to antenna direction adjuster 13 and to third extraordinary voltage detector 36.

FIG. 4 is a detailed circuit diagram showing extraordinary voltage detection portion 300 of FIG. 2. In FIG. 4, first extraordinary voltage detector 32 comprises a fifth transistor $Q_5$ of which the base electrode receives voltage $V_5$, which corresponds to $V_1$ or $V_2$, through a first node 39, and the emitter electrode receives reference voltage $V_{REF}$. Second extraordinary voltage detector 34 comprises a sixth transistor $Q_6$ of which the base electrode receives vertical and horizontal polarized wave control drive voltage $V_6$, which equals $V_3$, through a second node 49, and the emitter electrode receives reference voltage $V_{REF}$. Third extraordinary voltage detector 36 comprises a seventh transistor $Q_7$ of which the base electrode receives the supply voltage $V_4$ of the antenna direction adjuster through a third node 59, and the emitter electrode receives reference voltage $V_{REF}$. Each of extraordinary voltage detectors 32, 34 and 36 comprises a plurality of resistors tier stabilizing the voltage, and the collector electrodes of the three transistors are connected to one another and to an output terminal SEN. Extraordinary voltage detection portion 300 uses the collector electrodes which are connected to one another as a signal output terminal SEN, which is connected to microcomputer 400.

In FIG. 4, first extraordinary voltage detector 32 receives the voltage supplied to the low noise booster unit 12 through first node 39 to detect whether there is an extraordinary state in the supply voltage. In the normal state, the base voltage on fifth transistor $Q_5$ is high, and therefore PNP-type fifth transistor $Q_5$ is turned off. The output signal of fifth transistor $Q_5$ will be low and is supplied to sensing terminal SEN of microcomputer 400 when an extraordinary state is generated due to a disconnection of or a short in the cable which connects the exposed low noise booster unit 12 with the power supply source, i.e., the potential of first node 39 is abruptly lowered. Thus, the potential of the input terminal in first extraordinary voltage detector 32, which is connected to node 39, becomes lowered. As a result, since the base voltage of fifth transistor $Q_5$ becomes low, fifth transistor $Q_5$ is turned on. Accordingly, the output signal of fifth transistor $Q_5$ becomes high, and this high voltage is supplied to sensing terminal SEN of microcomputer 400.

Second extraordinary voltage detector 34 receives the vertical and horizontal polarized wave control drive voltage $V_6$ through second node 49 to detect whether there is an extraordinary state in the supply voltage. In the normal state, since the base voltage of sixth transistor $Q_6$ is high, PNP-type sixth transistor $Q_6$ is turned off. Therefore, the output signal of sixth transistor $Q_6$ is low and is supplied to sensing terminal SEN of microcomputer 400. When an extraordinary state is generated due to a short in the cable which connects the low noise booster unit 12 with the polarized wave controller 28 by an external conductor, the potential of second node 49 is abruptly lowered. As a result, the base voltage of sixth transistor $Q_6$ is low, and sixth transistor $Q_6$ is turned on. Accordingly, the output signal of sixth transistor $Q_6$ becomes high and is supplied to sensing terminal SEN of microcomputer 400.

Third extraordinary voltage detector 36 receives the voltage $V_4$ supplied to the antenna direction adjuster 13 through third node 59 to detect whether there is an extraordinary state in this supply voltage. In the normal state, since the base voltage of seventh transistor $Q_7$ is high, PNP-type seventh transistor $Q_7$ is turned off. Therefore, the output signal of seventh transistor $Q_7$ is low and is supplied to sensing terminal SEN of microcomputer 400. When an extraordinary state is generated due to a disconnection or a short of the cable which connects the antenna direction adjuster 13 with the power supply source, the potential of third node 59 is abruptly lowered. Thus, the base voltage of seventh transistor $Q_7$ is low, and seventh transistor $Q_7$ is turned on. Accordingly, the output signal of seventh transistor $Q_7$ becomes high and is supplied to sensing terminal SEN of microcomputer 400, to thereby inform the microcomputer of the extraordinary state.

When the input to terminal SEN of microcomputer 400 is high, indicating that one of the detectors 32, 34 or 36 has detected an extraordinary state, the microcomputer 400 sends a control signal CTL to switch portion 100 to cause the latter to open and block the application of supplied voltages to the outdoor units. The microcomputer also actuates a display device 500 to inform the user of the extraordinary condition.

As described above, the present invention supplies two voltage values to the low noise booster unit through switching to control the vertical and horizontal polarized wave, or can control the vertical and horizontal polarized waves through a separate power source instead of fixing the voltage supplied to the low noise booster unit. Also, when the exposed low noise unit and antenna direction adjuster extraordinarily operate, all the power sources for the low noise unit and antenna direction adjuster, and for controlling the vertical and horizontal polarized waves are disconnected. At the same time, the display device operates to inform the user of the cause of the failure.

I claim:

1. A power supply source control apparatus for a satellite broadcast receiver for use in a power supply source unit for supplying power to outdoor-installed satellite broadcast receiving facilities, said power supply source control apparatus comprising:
   a switch portion for selectively switching an input voltage source to an output thereof in response to a control signal applied thereto;
   a voltage generator connected to receive said input voltage through said switch portion for generating a plurality of supply voltages for driving the outdoor-installed satellite broadcast receiving facilities, said supply voltages being generated from said input voltage when applied thereto;
   a voltage selector connected to receive first and second supply voltages from said voltage generator for generating a fifth supply voltage in response to a first selection signal applied thereto;
   a polarized wave controller connected to receive a third supply voltage from said voltage generator for supplying a sixth supply voltage to a power supply source for controlling vertical polarized wave or horizontal polarized wave in response to a second selection signal;
   a microcomputer for supplying said first selection signal to said voltage generator, said second selection signal to said polarized wave controller, and said control signal to said switch portion; and
   an extraordinary voltage detection portion for comparing said fifth supply voltage from said voltage selector, said sixth supply voltage from said polarized wave controller and a fourth supply voltage from said voltage generator with a reference voltage value and supplying a comparison result to said microcomputer for causing said microcomputer to supply said control signal to said switch portion to block said input source voltage from passing therethrough when said comparison result indicates an extraordinary voltage condition of any of said fourth, fifth or sixth supply voltages.

2. A power supply source control apparatus for a satellite broadcast receiver according to claim 1, further comprising a display device which is connected to said microcomputer and is controlled by said microcomputer to indicate an extraordinary condition when said comparison result represents an extraordinary voltage condition of said fourth, fifth, or sixth supply voltage.

3. A power supply source control apparatus as claimed in claim 1, wherein said voltage generator comprises:
   a first regulator connected to receive said input voltage from said switch portion and to generate said second supply voltage, which is a voltage lower than said input voltage;
   a switch means responsive to said first selection signal for passing said input voltage as said first supply voltage to an output thereof;
   diode means connected between said first regulator and said switch means for passing said first supply voltage to an output of said voltage generator when said switch means passes said input voltage therethrough and for otherwise passing said second supply voltage slightly reduced to said output;
   said first or second supply voltage being connected to an outdoor low noise unit of said satellite broadcast receiver facilities and to said extraordinary voltage detection portion.

4. A power supply source control apparatus as claimed in claim 3, wherein said voltage generator further comprises:
   a second voltage regulator connected to receive said input voltage from said switch portion and to generate said fourth supply voltage, which is a voltage lower than said input voltage;
   said fourth supply voltage being connected to an outdoor antenna direction adjuster of said satellite receiver.

5. A power supply source control apparatus as claimed in claim 4, wherein said polarized wave controller comprises:
   a first transistor which is turned on and off in response to said second selection signal supplied from said microcomputer; and
   a second transistor which receives said third supply voltage and provides said third supply voltage as said sixth supply voltage of a first level for permitting a first polarization control when said first transistor is turned on, while modifying said third supply voltage to thereby produce said sixth supply voltage of a second level so as to permit a second polarization control when said first transistor is turned off.

6. A power supply source control apparatus as claimed in claim 1, wherein said extraordinary voltage detection portion comprises a means for generating a first signal when all of said fourth, fifth and sixth supply voltages are higher than said reference voltage, while generating a second signal when any of said fourth, fifth and sixth supply voltages is lower than said reference voltage value, and for supplying the generated signal to a sensing terminal of said microcomputer.

* * * * *